United States Patent
Moon et al.

[11] Patent Number: 6,138,908
[45] Date of Patent: *Oct. 31, 2000

[54] METHOD FOR UPDATING COMMUNICATIONS FACILITATION DATA

[75] Inventors: Billy G. Moon, Apex; Vikas Jain, Durham; Joseph R. Mesa, Raleigh, all of N.C.

[73] Assignee: Ericsson Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/934,122

[22] Filed: Sep. 19, 1997

[51] Int. Cl.$^7$ .................................................. G06K 5/00
[52] U.S. Cl. ........................ 235/380; 235/375; 709/206; 709/217
[58] Field of Search ............................ 395/200.3, 200.31, 395/200.36, 200.47, 683; 709/200, 201, 204, 206, 217, 303; 705/1; 235/380, 375

[56] References Cited

U.S. PATENT DOCUMENTS

| | | | |
|---|---|---|---|
| 5,493,105 | 2/1996 | Desai | 235/375 |
| 5,640,565 | 6/1997 | Dickinson | 395/683 |
| 5,706,517 | 1/1998 | Dickinson | 395/683 |
| 5,717,863 | 2/1998 | Adamson et al. | 395/200.34 |
| 5,732,229 | 3/1998 | Dickinson | 395/334 |
| 5,742,668 | 4/1998 | Pepe et al. | 379/58 |
| 5,752,059 | 5/1998 | Holleran et al. | 709/245 |
| 5,774,117 | 6/1998 | Kikkal et al. | 345/330 |
| 5,818,442 | 10/1998 | Adamson | 345/330 |
| 5,852,807 | 12/1998 | Skarbo et al. | 707/7 |
| 6,018,761 | 1/2000 | Uomini | 709/206 |

FOREIGN PATENT DOCUMENTS 8-8962  1/1996  Japan .

OTHER PUBLICATIONS

"Automatic Distribution List Update for Sending Mail to the Traveling User," IBM Technical Disclosure Bulletin, vol. 37, No. 02A, Feb. 1994, p. 465.

*Primary Examiner*—Zarni Maung
*Assistant Examiner*—Saleh Najjar
*Attorney, Agent, or Firm*—Coats & Bennett, PLLC

[57] ABSTRACT

A history list is used to automatically track where communications facilitation data, in the form of a communications facilitation data card, has been sent. When a communications facilitation data card is changed, the changed communications facilitation data card is automatically sent to all the previous sendees as indicated by the history list. This method applies both when the user changes their own communications facilitation data card and when a communications facilitation data card has been relayed by the user to a third party and an updated version of that communications facilitation data card is received. The maintenance of the history list and communications facilitation data cards are preferably performed in a personal communications assistant device and the sending is preferably via a wireless communications system. This method of handling communications facilitation data cards reduces errors and burden on the user when communications facilitation data cards are updated.

38 Claims, 2 Drawing Sheets

6,138,908

METHOD FOR UPDATING COMMUNICATIONS FACILITATION DATA

FIELD OF INVENTION

The present invention relates generally to the communications field and, in particular, to a method for updating communications facilitation data.

BACKGROUND OF THE INVENTION

The number of different types of communications services and communication methods have vastly increased in the recent past. In addition to regular mail and regular telephones, currently available communication methods include facsimile (fax) machines, cellular telephones, pagers, e-mail, and the internet. Each of these communications methods provides a different route for contacting a person. Further, each of these methods typically has associated with it a different set of contact information, such as a phone number or internet address. Because these methods are typically not mutually exclusive, it is possible, even likely, that a given person may have many different associated methods or routes for being contacted. Furthermore, as today's society has become more mobile, both personally and with respect to employment relationships, much of the specific contact information associated with these contact methods (e.g., phone numbers) changes over time.

With this complexity, it has become increasingly difficult to maintain, in an up-to-date fashion, a current list of contact information associated with an individual. It is also difficult for an individual to let others know that such contact information has changed. Keeping track of who should receive such updated contact information is one problem. Current methods, such as relying on memory or a manual list are subject to errors and omissions and/or are time consuming to maintain. Another problem is the amount of time required to compile and send the updated contact information to the desired recipients.

Thus, there exists a need for an improved method for sending updated contact information to desired recipients.

SUMMARY OF THE INVENTION

A communications facilitation data card is described which may contain a wide variety of contact information, including time-dependent contact information. When each communications facilitation data card is sent to another person, a history list is automatically maintained which keeps track of where the communications facilitation data card has been sent. Thereafter, when a communications facilitation data card is changed, the user is given the opportunity to automatically send the changed communications facilitation data card to all the previous sendees indicated by the history list. If the user indicates "yes," the sending is preferably completely automatic. This method applies both when the user changes their own communications facilitation data card and when a communications facilitation data card has been relayed by the user to a third party and an updated version of that communications facilitation data card is received. The maintenance of the history list and communications facilitation data cards are preferably performed in a personal communications assistant device and the sending is preferably via a wireless communications system. Further, the history list and communications facilitation data cards are preferably maintained in one or more databases. Automatic use of the history table reduces errors and burden on the user.

DETAILED DESCRIPTION OF THE PREFERRED EMBODIMENT

Figure 1:
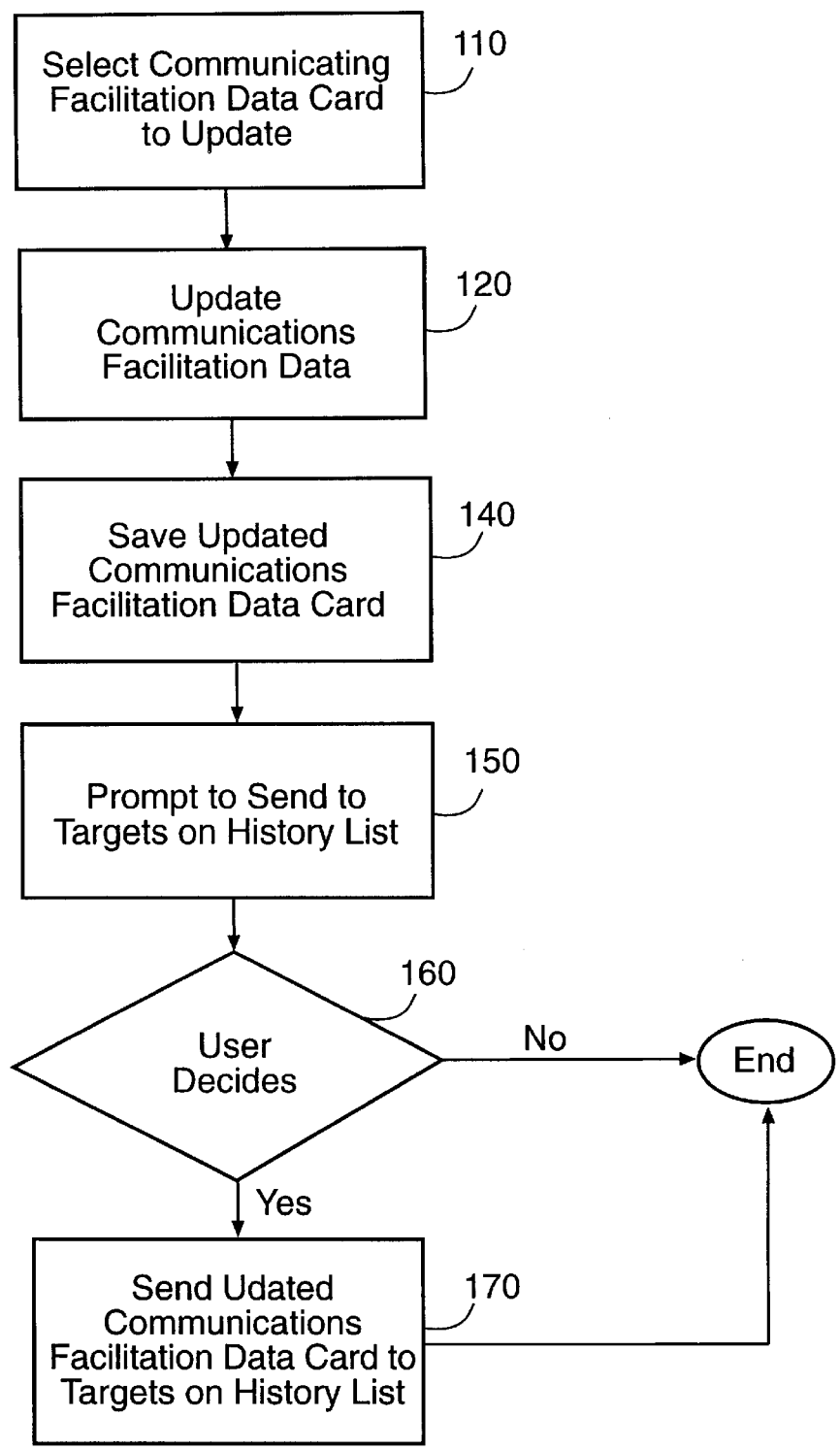
FIG. 1 is a simplified logic flow diagram of the present method for updating a communications facilitation data card.

Many years ago, a person might have had two principle "addresses" for making communications contact, a mailing address and a telephone number. Further, a person might have had two sets of addresses, one personal and one for business. For most business purposes, the business addresses would be presented on a standard business card, typically along with a job title and company logo.

Now, these addresses are supplemented by fax addresses, e-mail addresses, internet web page Uniform Resource Locators (URLs), mobile numbers, pager numbers, etc. For simplicity, all of these contact points are referred to as "addresses." As the sheer number of possible addresses for a single person have increased, it has become increasingly difficult to present such contact information on a typical business card. In addition, the increased number of contact points has led to problems with keeping the information current, such as when a person gets a new fax number or an e-mail address as a result of a job change.

In response to this situation, the concept of a communications facilitation data card has been developed. The communications facilitation data card can be thought of as an enhanced business card. The communications facilitation data card is not a physical "card" but is an electronic virtual "card" which contains communications facilitation data. Communications facilitation data includes normal contact information such as name, personal mailing address, personal phone numbers, company name, company mailing address, company phone numbers, facsimile number, e-mail address, URLs, pager number, job title, or any combination of the above. In addition, the communications facilitation data may include some indication of when a particular method of communication should be used instead of another. For instance, a person may wish to indicate that they should be contacted via a certain contact address, such as a phone number, during the hours of 8 to 5 Monday through Friday, but via another address, such as a fax number, from 5 to 8 Monday through Friday, and another address for Saturday, and no address whatsoever on Sunday. This time dependent contact information would be another type of communications facilitation data.

In addition, the communications facilitation data may also include other contact related information such as a company logo, a photo identification, advertising, and an indication as to the type of business the individual is involved with.

It should be noted that a given user may wish to have several different communications facilitation data cards. For instance, one communications facilitation data card may appropriate for business associates while another may be appropriate for personal friends.

There are two types of communications facilitation data cards. The first are communications facilitation data cards for the user. The second are communications facilitation data cards for others. Using the business card analogy, the first type corresponds to the user's own business card, while the second type corresponds to the business cards of others. For simplicity, the first type is sometimes referred to as "sender's communications facilitation data cards." Both types of communications facilitation data cards may contain similar information; the distinction is merely between what person the communications facilitation data card relates to. A user may receive others' communications facilitation data cards directly from the originator or via third parties who have forwarded them to the user.

Communication facilitation data cards are typically maintained in a database where each communications facilitation data card can be uniquely identified by some indicator such as card number or card name. In order to use the communications facilitation data card, the indicator must typically be known. Once the indicator is known, the communication facilitation data card can be selected from within the database, and its associated communication facilitation data can be extracted by a conventional database look-up procedure. This communication facilitation data can then be used to determine the appropriate address to be used for contacting the person represented by the selected communications facilitation data card.

It should be further noted that a user may wish to organize a collection of communications facilitation data cards, particularly those of others, into sub-groups, such as personal and business, for ease of use.

Methods have been identified for creating, sending, editing, and using communications facilitation data cards. However, such methods do not address how to update a communications facilitation data card satisfactorily.

In order to update a communications facilitation data card, the communications facilitation data card must be edited. Thereafter, the edited communications facilitation data card must be sent to the appropriate recipients. For simplicity, the term "targets" is used to refer to individuals and/or businesses that are the desired recipients of the communications facilitation data cards; this is so as to distinguish this group from the group of actual recipients which may be a subset of the target group.

The prior art process for updating the communications facilitation data began by selecting a communications facilitation data card to update. Next, the communication facilitation data associated with that communications facilitation data card was updated. Last, the updated communications facilitation data card was saved.

The previous method for sending the updated communications facilitation data card began with selecting the communications facilitation data card to be sent. Next, the first target was selected. Then the selected communications facilitation data card was sent to that target. If there are more targets, then the process looped back and the next target was selected. Thus, the typical process for sending the updated communications card involved identifying a target, sending the communications facilitation data card, identifying the next target, sending the communications facilitation data card, identifying the next target, sending the communications facilitation card again, and so forth. Obviously, in such a method there is a large opportunity for error in that the sender may forget to identify one or more targets, or a user may be interrupted during the sending process and either fail to return to the sending process or return but accidentally skip over some targets. In such a situation, not all targets will be sent the communications facilitation data card. When this happens, the missed targets may no longer be able to contact the sender. In addition, any third parties who have been sent the user's communications facilitation data card by the targets will likewise not be sent the updated communications facilitation data.

The present method improves the reliability of the previous process and reduces the amount of user time required to perform the process. The present updating method involves automatically tracking to whom the communications facilitation data card is sent and saving a list of such targets. Thereafter, when a user updates her communications facilitation data card, the list of previous sendees can be automatically used to send the updated communications facilitation data card to all those who were previously sent the "old" communications facilitation data card.

When a user creates a new communications facilitation data card for themselves and sends it to others, the sender's communications facilitation data card is sent to the appropriate addresses as indicated by the communications facilitation data card associated with the others (the "target communications facilitation data cards"). The present method maintains an electronic listing of these target communications facilitation data cards, called the history list. The history list does not contain the target communications facilitation data cards themselves, but rather includes indicators to the respective target communications facilitation data cards. For instance, the history list might contain only card numbers, these card numbers corresponding to the target communications facilitation data cards where the outgoing communications facilitation data card has been sent in the past. When the user later sends the same communications facilitation data card, edited or not, to another target, that target's communications facilitation data card is added to the history list. Preferably, history list is maintained for all communications facilitation data cards that are sent out, including others' communications facilitation data cards that are sent to third parties.

When the user desires to update his communications facilitation data card, the user selects the communications facilitation data card to be updated (box 110). The communications facilitation data card is then edited (box 120) and saved (box 140). The user is then prompted to send the updated communications facilitation data card to those on the history list (box 150). If the user chooses yes (box 160), the updated communications facilitation data card is automatically sent to those targets indicated by the associated history list (box 170). Based on the indicators in the history list, one or more target communications facilitation data cards are selected. The communication facilitation data for these target communications facilitation data cards are examined and the appropriate target addresses are identified. Then, using these target addresses, the edited communications facilitation data card is sent to the target(s) (box 170). If the user selects no (box 160), the updated communications facilitation data card is not sent.

The identification of target addresses, and the subsequent sending of the updated communications facilitation data card, may be done either stepwise or in batch fashion. That is to say, the process may be along the lines of look-up, send, look-up, send, etc. or the process may be along the lines of look-up, look-up, look-up, send, send, send.

Thus, in the present method, the history list is used to automatically keep track of targets that have been sent the communications facilitation data, thereby reducing errors. Further, the present method also automatically sends the updated communications facilitation data card to those indicted by the history list, thereby reducing the burden on the user by lessening the user's time required to send the updated communications facilitation data card to targets.

In one embodiment of the present invention, the history list can be edited, meaning that indicators may be added to the history list without sending the associated communications facilitation data card to the added target. Further, by editing the history list, indicators may be removed from the history list.

FIG. 1 shows the present method from the user's perspective. First, the user selects the communications facilitation data card to be updated (box 110). Next, the user updates the appropriate communications facilitation data (box 120). Once updated, the communications facilitation data card is saved (box 140). The user is then automatically prompted to resend the communications facilitation data card to the previous sendees (box 150). If the user selects "yes" (box 160), then the updated communications facilitation data card is sent to the targets indicated by the history list (box 170). If the user selects "no" (box 160), then the updated communications facilitation data card is not sent.

Further, it is anticipated that when a target receives the sender's updated communications facilitation data card, the target will check to see if the target had previously relayed the corresponding "old" communications facilitation data card to any third parties by referencing the appropriate history list. If so, the target will preferably be alerted and queried whether to relay the updated communications facilitation data card to those third party targets (in essence, the target's targets). If the target indicates yes, the updated communications facilitation data card would be automatically sent to the targets indicated by the history list (maintained by the target for that communications facilitation data card.) Thus, the updated communications facilitation data can be disseminated from station to station in a cascade or ripple fashion.

The present invention is intended to encompass the situation when targets are natural persons, when targets are businesses, or any combination thereof.

The present method can be carried out on any computer, however the present method is preferably carried out on a personal communications assistant 400 or similar device. A personal communications assistant 400 is a device which combines two or more communications functions in a single device. For instance, a personal communications assistant 400 may combine the functions of a cellular phone, a pager, and an internet access point. The personal communication assistant 400 may also include normal personal computer functions. It is envisioned that the history list will be maintained within the personal communications assistant device 400, as will both the user's and targets' communications facilitation data cards. Further, it is envisioned that the personal communications assistant 400 will be programmed to allow communications facilitation data cards to be created, stored, edited, and used.

Figure 2:
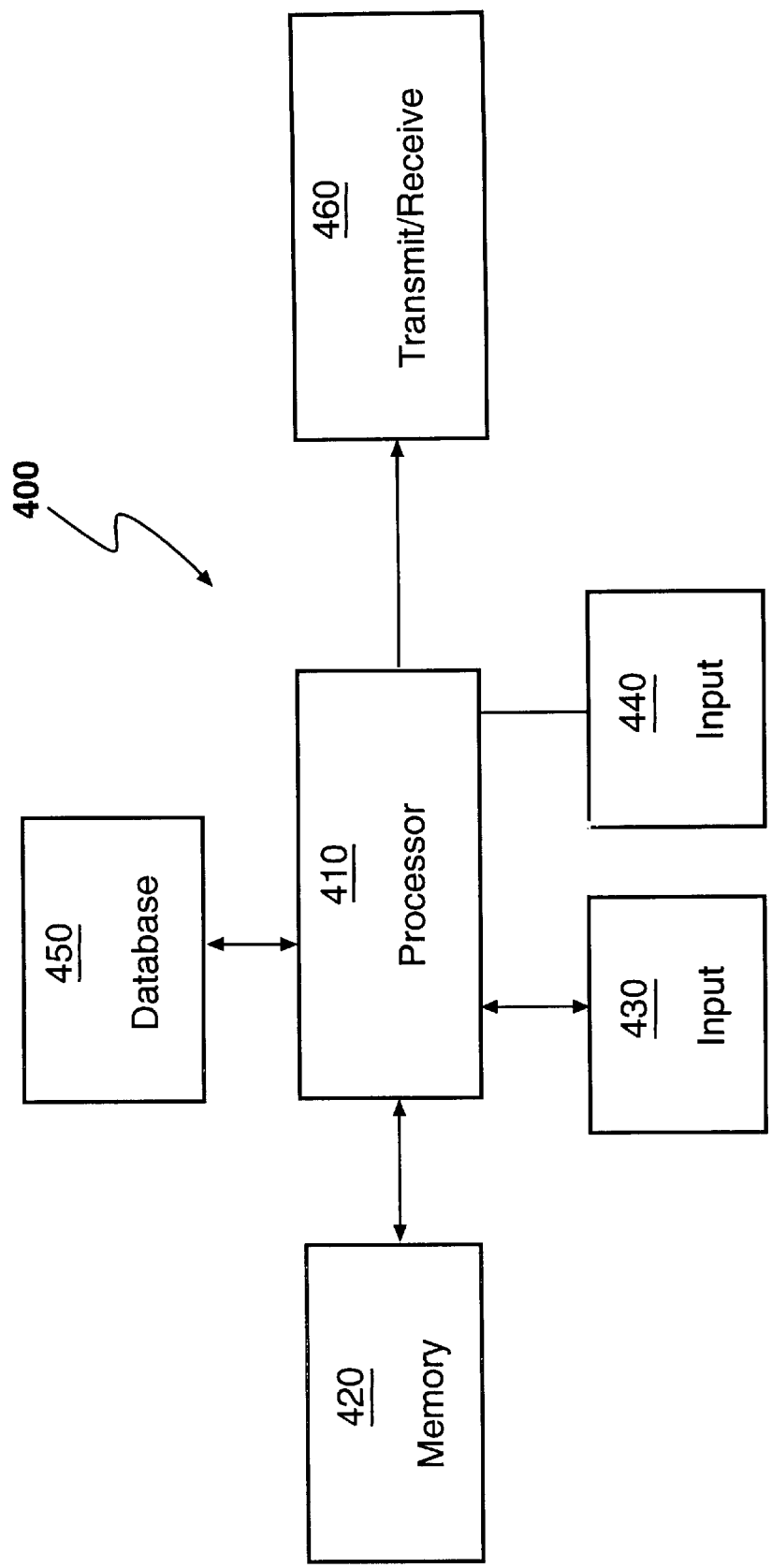
FIG. 2 is a simplified diagram of the components of a personal communications assistant.

Referring to FIG. 2, a personal communications assistant may include a programmable processor 410, memory 420, input means 430, a display 440, a database 450, and a transmitter/receiver 460. The processor 410 controls the overall function of the personal communications assistant 400. The memory 420 works in a conventional fashion. The input means 430 allows input by a user and is preferably a keyboard and mouse combination. The display 440 is a conventional computer display such as a color LCD screen. The database 450 stores information, and, more particularly, includes communications facilitation data card(s) and associated history list(s). The transmitter/receiver 460 allows the personal communications assistant 400 to communicate with other electronic devices. Preferably, the transmitter/receiver 460 is designed to work in a wireless communications system environment, such as in digital cellular telephone network, and can handle multiple simultaneous calls.

It is preferred that the personal communications assistant 400 of the present invention be programmed with a graphical user interface, such as Windows 95 by Microsoft, Inc, for creating, selecting, editing, and using communications facilitation data cards.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method for updating a communications facilitation data card, comprising:
   a) connecting to a first target machine associated with a target;
   b) sending a communications facilitation data card from a source machine associated with an individual user to the target;
   c) automatically maintaining a history list of targets associated with said communications facilitation data card on said source machine by comparing said target to said history list and adding said target to said history list if said target is not on said history list;
   d) disconnecting from said first target machine;
   e) thereafter, editing said communications facilitation data card; and
   f) thereafter, in response to said editing, sending said edited communications facilitation data card from said source machine to said targets on said history list by reconnecting to at least said first target machine.

2. The method of claim 1 further including said source machine querying the user for a response on whether to send said edited communications facilitation data card to said targets on said history list and wherein said sending of said edited communications facilitation data card to all said targets is automatic if said response is affirmative.

3. The method of claim 1 wherein said history list is maintained in a personal communications assistant device.

4. The method of claim 1 wherein said communications facilitation data card is edited in a personal communications assistant device.

5. The method of claim 1 wherein said sending of said edited communications facilitation data card is via a wireless communications system.

6. The method of claim 1 further comprising editing said history list to add or remove a target from said history list.

7. The method of claim 1 wherein said communications facilitation data card includes time-dependent contact information.

8. The method of claim 1 wherein said communications facilitation data card includes two or more of the following:
   a) name;
   b) personal mailing address;
   c) personal phone number;
   d) company name;
   e) company mailing address;
   f) company phone number;
   g) e-mail address;
   h) uniform resource locator; and
   i) pager number.

9. The method of claim 8 wherein said communications facilitation data card further includes one or more of the following:

a) company logo;
b) job title;
c) photo identification;
d) advertising; and
e) an indication as to the type of business the individual is involved with.

10. A method for updating a communications facilitation data card, comprising:
   a) sending a communications facilitation data card from a personal communications assistant device associated with an individual user to a target by connecting to a first target machine, transmitting the communications facilitation data card and then disconnecting from said first target machine;
   b) automatically maintaining a history list of targets associated with said communications facilitation data card in said personal communications assistant device by comparing said target to said history list and adding said target to said history list if said target is not on said history list;
   c) thereafter, editing said communications facilitation data card in at said personal communications assistant device;
   d) after editing, querying a user for a response on whether to send said edited communications facilitation data card to said targets on said history list;
   e) thereafter, if said response is affirmative, automatically sending by reconnecting to at least said first target machine said edited communications facilitation data card from said personal communications assistant device to said targets on said history list; and
   f) wherein said communications facilitation data card includes two or more of the following:
      i) name;
      ii) personal mailing address;
      iii) personal phone number;
      iv) company name;
      v) company mailing address;
      vi) company phone number;
      vii) e-mail address;
      viii) uniform resource locator; and
      ix) pager number.

11. The method of claim 10 wherein said communications facilitation data card includes time-dependent contact information.

12. The method of claim 10 wherein said sending of said edited communications facilitation data card is via a wireless communications system.

13. A method for updating a communications facilitation data card, comprising:
   a) maintaining a database of addresses on a source machine associated with an individual user, wherein each address is associated with an available communications facilitation data card;
   b) sending a sender's communications facilitation data card from said source machine to an address as indicated on a target's communications facilitation data card by connecting to a first target machine, transmitting the information and then disconnecting from said first target machine;
   c) automatically maintaining a history list on said source machine; said history list including indicators to communications facilitation data cards where said sender's communications facilitation data card has been sent;
   d) thereafter, editing said sender's communications facilitation data card;
   e) after editing, selecting target communications facilitation data cards according to the indicators of said history list;
   f) after selecting, looking up a target address in said database for each of said target communications facilitation data cards; and
   g) after looking up, automatically sending said edited sender's communications facilitation data card from said source machine to said target addresses by reconnecting to at least said first target machine.

14. The method of claim 13 wherein said database includes time dependent address information.

15. The method of claim 13 further including querying a user for a response on whether to send said edited sender's communications facilitation data card to said targets on said history list and wherein said sending of said edited sender's communications facilitation data card is automatic if said response is affirmative.

16. The method of claim 13 wherein said source machine is a personal communications assistant device.

17. The method of claim 13 wherein said sender's communications facilitation data card is edited in a personal communications assistant device.

18. The method of claim 13 wherein said sending of said edited sender's communications facilitation data card is via a wireless communications system.

19. The method of claim 13 further comprising editing said history list to add or remove indicators from said history list.

20. The method of claim 13 wherein said communications facilitation data card includes two or more of the following:
   a) name;
   b) personal mailing address;
   c) personal phone number;
   d) company name;
   e) company mailing address;
   f) company phone number;
   g) e-mail address;
   h) uniform resource locator; and
   i) pager number.

21. The method of claim 20 wherein said communications facilitation data card further includes one or more of the following:
   a) company logo;
   b) job title;
   c) photo identification;
   d) advertising; and
   e) an indication as to the type of business the individual is involved with.

22. A method for updating a communications facilitation data card, comprising:
   a) maintaining a database of addresses on a source machine associated with an individual user, wherein each address is associated with an available communications facilitation data card, said source machine being a personal communications assistant device;
   b) sending a sender's communications facilitation data card to an address as indicated on a target's communications facilitation data card by connecting to a first target machine, transmitting the communications facilitation data card and disconnecting from said first target machine;
   c) automatically maintaining a history list in said source machine; said history list including indicators to communications facilitation data cards where said sender's communications facilitation data card has been sent;

d) thereafter, editing, in said source machine, said sender's communications facilitation data card;

e) after editing, selecting target communications facilitation data cards according to the indicators of said history list;

f) after selecting, looking up a target address in said database for each of said target communications facilitation data cards;

g) after looking up, automatically sending said edited sender's communications facilitation data card from said source machine to said target addresses by reconnecting to at least said first target machine; and h) wherein said communications facilitation data card includes two or more of the following:
   i) name;
   ii) personal mailing address;
   iii) personal phone number;
   iv) company name;
   v) company mailing address;
   vi) company phone number;
   vii) e-mail address;
   viii) uniform resource locator; and
   ix) pager number.

23. The method of claim 22 wherein said database includes time dependent address information.

24. The method of claim 22 further including querying a user for a response on whether to send said edited sender's communications facilitation data card to said targets on said history list and wherein said sending of said edited sender's communications facilitation data card is automatic if said response is affirmative.

25. The method of claim 22 wherein said sending of said edited sender's communications facilitation data card is via a wireless communications system.

26. A method for updating a communications facilitation data card, comprising:

a) receiving a communications facilitation data card from a first station associated with an individual user at a second station associated with an individual user;

b) relaying, by said second station, said communications facilitation data card to a second generation target at a third station;

c) automatically maintaining a second generation history list of second generation targets associated with said communications facilitation data card at said second station by comparing said second generation target to said second generation history list and adding said second generation target to said second generation history list if said second generation target is not on said history list;

d) receiving, at said second station, an update to said communications facilitation data card; and e) automatically relaying said update from said second station to said second generation targets on said second generation history list.

27. The method of claim 26 further comprising storing said communications facilitation data card and said update at said second station.

28. The method of claim 26 wherein said second station is a personal communications assistant device.

29. The method of claim 26 wherein said relaying of said update is via a wireless communications system.

30. The method of claim 26 further comprising editing said history list to add or remove a target from said history list.

31. The method of claim 26 wherein said communications facilitation data card includes time-dependent contact information.

32. The method of claim 26 wherein said communications facilitation data card includes two or more of the following:
   a) name;
   b) personal mailing address;
   c) personal phone number;
   d) company name;
   e) company mailing address;
   f) company phone number;
   g) e-mail address;
   h) uniform resource locator; and
   i) pager number.

33. The method of claim 32 wherein said communications facilitation data card further includes one or more of the following:
   a) company logo;
   b) job title;
   c) photo identification;
   d) advertising;
   e) an indication as to the type of business the individual is involved with.

34. A method for updating a communications facilitation data card, comprising:

a) receiving a communications facilitation data card from a first station associated with a first individual user at a second station associated with a second individual user;

b) storing said communications facilitation data card at said second station;

c) relaying, by said second station, said communications facilitation data card to a second generation target at a third station by connecting to a second generation target machine, transmitting the communications facilitation data card and disconnecting from said second generation target machine;

d) automatically maintaining a second generation history list of second generation targets associated with said communications facilitation data card at said second station by comparing said second generation target to said second generation history list and adding said second generation target to said second generation history list if said second generation target is not on said second generation history list;

e) receiving, at said second station, an update to said communications facilitation data card;

f) storing said update at said second station;

g) automatically relaying said update from said second station to said second generation target by reconnecting to at least said second generation target machine; and h) wherein said communications facilitation data card includes two or more of the following:
   i) name;
   ii) personal mailing address;
   iii) personal phone number;
   iv) company name;
   v) company mailing address;
   vi) company phone number;
   vii) e-mail address;
   viii) uniform resource locator; and
   x) pager number.

35. The method of claim 34 wherein said communications facilitation data card includes time-dependent contact information.

36. The method of claim 34 further including querying a user for a response on whether to send said update to said targets on said history list and wherein said relaying of said update is automatic if said response is affirmative.

37. The method of claim 34 wherein said relaying of said update is via a wireless communications system.

38. The method of claim 34 wherein said second station is a personal communications assistant device.

* * * * *